(12) United States Patent
Alasti et al.

(10) Patent No.: US 7,929,497 B1
(45) Date of Patent: Apr. 19, 2011

(54) MOBILE STATION SERVICE SESSION HANDOFF

(75) Inventors: Mehdi Alasti, Rockville, MD (US); Mohammad Hassan Partovi, Potomac, MD (US); Feng Huang, Herndon, VA (US)

(73) Assignee: Clear Wireless LLC, Kirkland, WA (US)

(*) Notice: Subject to any disclaimer, the term of this patent is extended or adjusted under 35 U.S.C. 154(b) by 729 days.

(21) Appl. No.: 12/020,675

(22) Filed: Jan. 28, 2008

(51) Int. Cl.
*H04W 4/00* (2009.01)
(52) U.S. Cl. .................................... 370/331; 455/436
(58) Field of Classification Search .................. 370/328, 370/329, 331, 338; 455/436, 442
See application file for complete search history.

(56) References Cited

U.S. PATENT DOCUMENTS

| | | |
|---|---|---|
| 2006/0062180 A1 | 3/2006 | Sayeedi et al. |
| 2006/0072506 A1 | 4/2006 | Sayeedi et al. |
| 2006/0111111 A1 | 5/2006 | Ovadia |
| 2006/0160533 A1 | 7/2006 | Chou et al. |
| 2007/0025293 A1 | 2/2007 | Choi |

OTHER PUBLICATIONS

WIMAX Forum; "WiMAX Forum Network Architecture (Stage 3: Detailed Protocols and Procedures) [Annex: WiMAX—3GPP2 Interworking];" Jul. 11, 2007; 17 pages; Release 1.1.0; WiMAX Forum Proprietary.
WIMAX Forum; "WiMAX Forum Network Architecture (Stage 3: Detailed Protocols and Procedures) [Annex: R6/R8 ASN Anchored Mobility Scenarios];" Jul. 11, 2007; 15 pages; Release 1.1.0; WiMAX Forum Proprietary.
WIMAX Forum; "WiMAX Forum Network Architecture (Stage 3: Detailed Protocols and Procedures) [Annex: Prepaid Accounting];" Jul. 11, 2007; 44 pages; Release 1.1.0; WiMAX Forum Proprietary.
WIMAX Forum; "WiMAX Forum Network Architecture (Stage 2: Architecture Tenets, Reference Model and Reference Points) [WiMAX Interworking with DSL];" Jul. 11, 2007; 8 pages; Release 1.1.0; WiMAX Forum Proprietary.
WIMAX Forum; "WiMAX Forum Network Architecture (Stage 3: Detailed Protocols and Procedures) [Annex: WiMAX—3GPP Interworking];" Jul. 11, 2007; 12 pages; Release 1.1.0; WiMAX Forum Proprietary.
WIMAX Forum; "WiMAX Forum Network Architecture (Stage 2: Architecture Tenets, Reference Model and Reference Points) [Stage 2 and Stage 3 Abbreviations];" Jul. 11, 2007; 9 pages; Release 1.1.0; WiMAX Forum Proprietary.
WIMAX Forum; "WiMAX Forum Network Architecture (Stage 2: Architecture Tenets, Reference Model and Reference Points) [3GPP—WiMAX Interworking];" Jul. 11, 2007; 10 pages; Release 1.1.0; WiMAX Forum Proprietary.
WIMAX Forum; "WiMAX Forum Network Architecture (Stage 2: Architecture Tenets, Reference Model and Reference Points) [3GPP2—WiMAX Interworking];" Jul. 11, 2007; 5 pages; Release 1.1.0; WiMAX Forum Proprietary.
WIMAX Forum; "WiMAX Forum Architecture (Stage 2: Architecture Tenets, Reference Model and Reference Points) [Part 0];" Jul. 11, 2007; 8 pages; Release 1.1.0; WiMAX Forum Proprietary.

(Continued)

*Primary Examiner* — Brian D Nguyen
(74) *Attorney, Agent, or Firm* — O'Brien Jones PLLC

(57) ABSTRACT

A method of operating a communication system is disclosed. A first communication session between a first base station and a mobile station is established. A service session between a first access network and the mobile station is established. When the mobile station moves to the service area of a new base station, a second communication session between a second base station and the mobile station is established. A distance between the first base station and the second base station is determined. If the distance exceeds a criteria, the service session is handed off a second access network. The criteria, which must be greater than zero, corresponds to the number of base station service areas separating the first base station and the second base station.

20 Claims, 5 Drawing Sheets

OTHER PUBLICATIONS

WIMAX Forum; "WiMAX Forum Network Architecture (Stage 2: Architecture Tenets, Reference Model and Reference Points) [Part 1];" Jul. 11, 2007; 37 pages; Release 1.1.0; WiMAX Forum Proprietary.

WIMAX Forum; WiMAX Forum Network Architecture (Stage 2: Architecture Tenets, Reference Model and Reference Points) [Part 2]; Jul. 11, 2007; 160 pages; Release 1.1.0; WiMAX Forum Proprietary.

WIMAX Forum; "WiMAX Forum Network Architecture (Stage 2: Architecture Tenets, Reference Model and Reference Points) [Part 3—Informative Annex];" Jul. 11, 2007; 28 pages; Release 1.1.0; WiMAX Forum Proprietary.

WIMAX Forum; "WiMAX Forum Network Architecture (Stage 3: Detailed Protocols and Procedures);" Jul. 11, 2007; 518 pages; Release 1.1.0; WiMAX Forum Proprietary.

MOBILE STATION SERVICE SESSION HANDOFF

TECHNICAL BACKGROUND

The Worldwide Interoperability for Microwave Access, (a.k.a., WiMAX) is a telecommunications technology aimed at exchanging wireless data. WiMAX specified standards include point-to-point links and full mobile cellular type access. WiMAX is based on the IEEE 802.16 set of standards. To promote conformance and interoperability of WiMAX equipment and software, various stakeholders formed the WiMAX forum. The WiMAX forum publishes several technical documents that specify aspects of a WiMAX system.

WiMAX forum technical documents include the WiMAX Forum Network Architecture. The WiMAX Forum Network Architecture specification includes documentation for such things as definitions, Architecture Tenets, a Reference Model, and Reference Points. The WiMAX Forum Network Architecture Release 1.1.0, Jul. 11, 2007 available from the WiMAX forum at www.wimaxforum.org is hereby incorporated herein by reference.

The system architecture promulgated by the WiMAX forum defines various entities that include Mobile Stations (MSs), Base Stations (BSs), Access Service Networks (ASNs), Access Service Network Gateways (ASN-GWs), and Connectivity Service Networks (CSNs). Also included in the WiMAX Forum Network Architecture are protocols to handoff a moving device from one BS to another and from one ASN or ASN-GW to another.

Overview

A method of operating a communication system is disclosed. A first communication session between a first base station and a mobile station is established. A service session between a first access network and the mobile station is established. When the mobile station moves to the service area of a new base station, a second communication session between a second base station and the mobile station is established. A distance between the first base station and the second base station is determined. If the distance exceeds a criteria, the service session is handed off to a second access network. The criteria, which must be greater than zero, corresponds to a number of base station service areas separating the first base station and the second base station.

A communication system is disclosed. A first access network is coupled to a first base station and a second base station. A number of base station service areas separate the first base station and the second base station. A second access network is also coupled to the first base station and the second base station. The first base station establishes a communication session with a mobile station. The first base station establishes a service session between the mobile station and the first access network. The second base station establishes a service session between the mobile station and the second access network if a distance between the first base station and the second base station satisfies a distance criteria. The distance criteria, which must be greater than zero, is based on a number of base station service areas separating the first base station and the second base station.

A first communication session is established between a first base station and a mobile station. A service session is established between a first Access Service Network Gateway (ASN-GW) and the mobile station. A second communication session is established between a second base station and the mobile station. A distance between the first base station and the second base station is determined. If the distance exceeds a criteria, the service session is handed off from the first ASN-GW to the second ASN-GW. The criteria, which must be greater than zero, corresponds to a number of base station service areas separating the first base station and the second base station.

DETAILED DESCRIPTION

Figure 1:
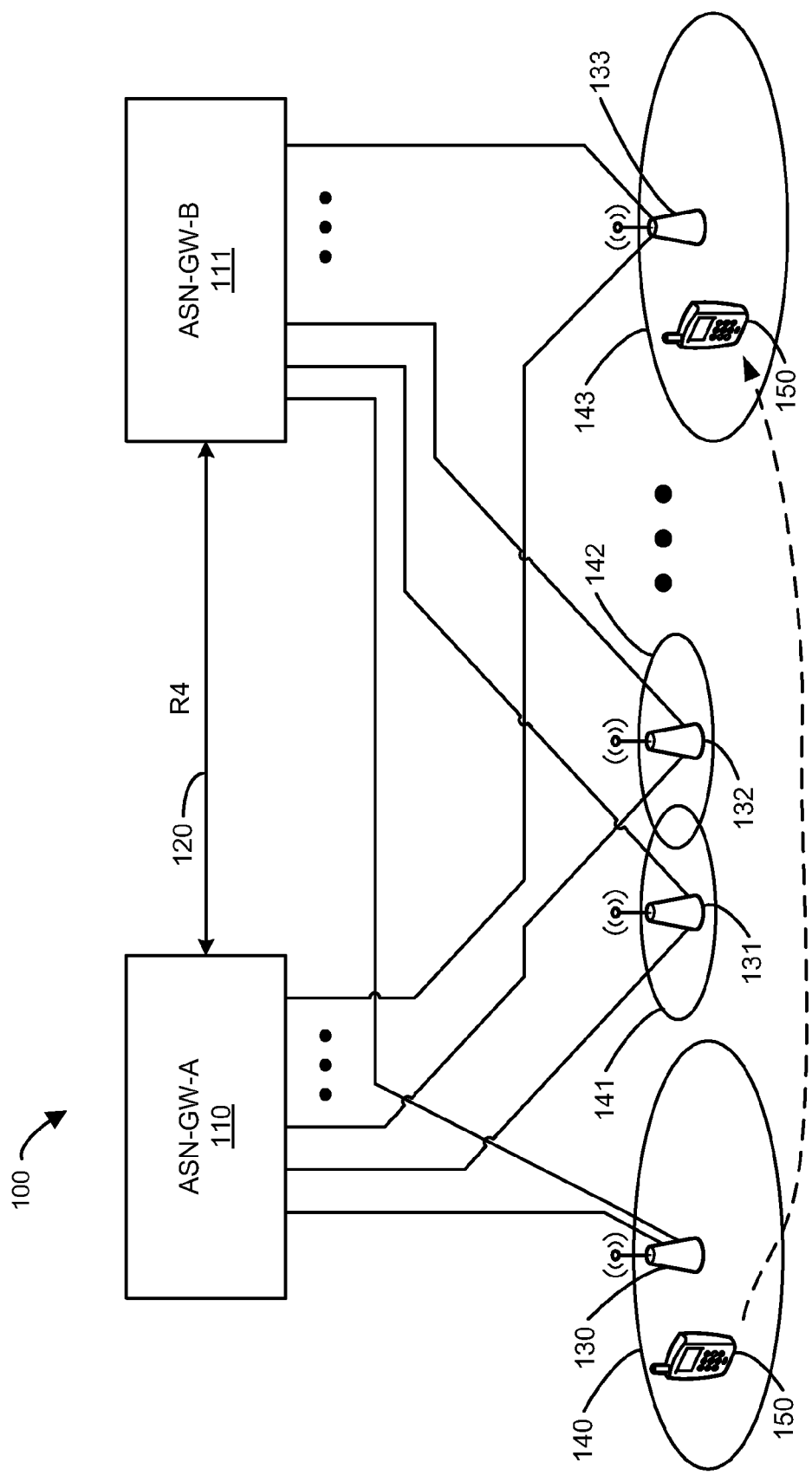
FIG. 1 is a block diagram illustrating a communication system.

FIG. 1 is a block diagram illustrating a communication system. Communication system 100 comprises ASN-GW-A 110; ASN-GW-B 111; R4 protocol link 120; base stations 130-133; base station service areas 140-143; and mobile station 150. ASN-GW-A 110 is operatively coupled to ASN-GW-B 111 via R4 protocol link 120. Base stations 130-133 are each operatively coupled to ASN-GW-A 110. Base stations 130-133 are also each operatively coupled to ASN-GW-B 111. Base stations 130-133 may be operatively coupled to ASN-GW-A 110 and ASN-GW-B by two separate physical or wireless links, or by a logical link via the other ASN-GW.

Base station service areas 140-143 each correspond to the service area served by base stations 130-133, respectively. Base station service areas 141 and 142 represent base station service areas that separate base station 130 and base station 133. Mobile station 150 is shown in base station service area 140. Mobile station 150 is also shown in base station service area 143. A dashed arrow is shown between the two instances of mobile station 150 to show that mobile station 150 has moved from base station service area 140 to base station service area 143.

Communication network 100 maintains a state variable which identifies the base station 130 where the most recent handoff of the service session for mobile device 150 occurred. The most recent handoff may have been accomplished by R4 protocol communications exchanged between ASN-GW-A 110, ASN-GW-B 111, or another ASN-GW. If mobile device 150 has never had a service session handoff since it entered communication network 100, the state variable may identify the base station 130 where mobile device 150 entered communication network 100.

When mobile device 150 enters a new base station service area 141-143, communication network 100 determines a distance between the base station identified by the state variable and the new base station. For example, communication network 100 may determine the number of base station service areas crossed by a line between the new base station and the base station identified by the state variable. In another example, communication network 100 may determine the minimum number of base station service areas between the service area for the new base station and the service area for the base station identified by the state variable. In another example, communication network 100 may determine the minimum number of base station service areas that must be crossed along a path from the new base station to the base station identified by the state variable. In another example, communication network 100 may determine the number of unique base station service areas traversed by mobile station 150 between the base station identified by the state variable and the new base station.

If the distance exceeds a certain criteria, then communication network 100 hands off the service session from one ASN-GW to another. Communication network 100 may use R4 protocol link 120 to accomplish this handoff. For example, if the determined distance corresponds to N base station service areas separating the base station identified by the state variable and the new base station (where N is an arbitrary number greater than zero) then communication network 100 may handoff the service session from ASN-GW-A 110 to ASN-GW-B 111. In an example, N may be three. By performing the service session handoff only when the new base station is a certain distance away from where the last handoff occurred, the communication burden of performing the R4 protocol handoff is distributed among a larger number of base stations 130-133 than if the R4 protocol always took place along a fixed boundary. In addition, by establishing a minimum distance between handoffs, the "ping-pong" effect is eliminated. The ping-pong effect is characterized by a mobile station frequently crossing between two base station service area boundaries thereby causing two ASN-GWs to frequently handoff service sessions each time the mobile station changes base stations.

Figure 2:
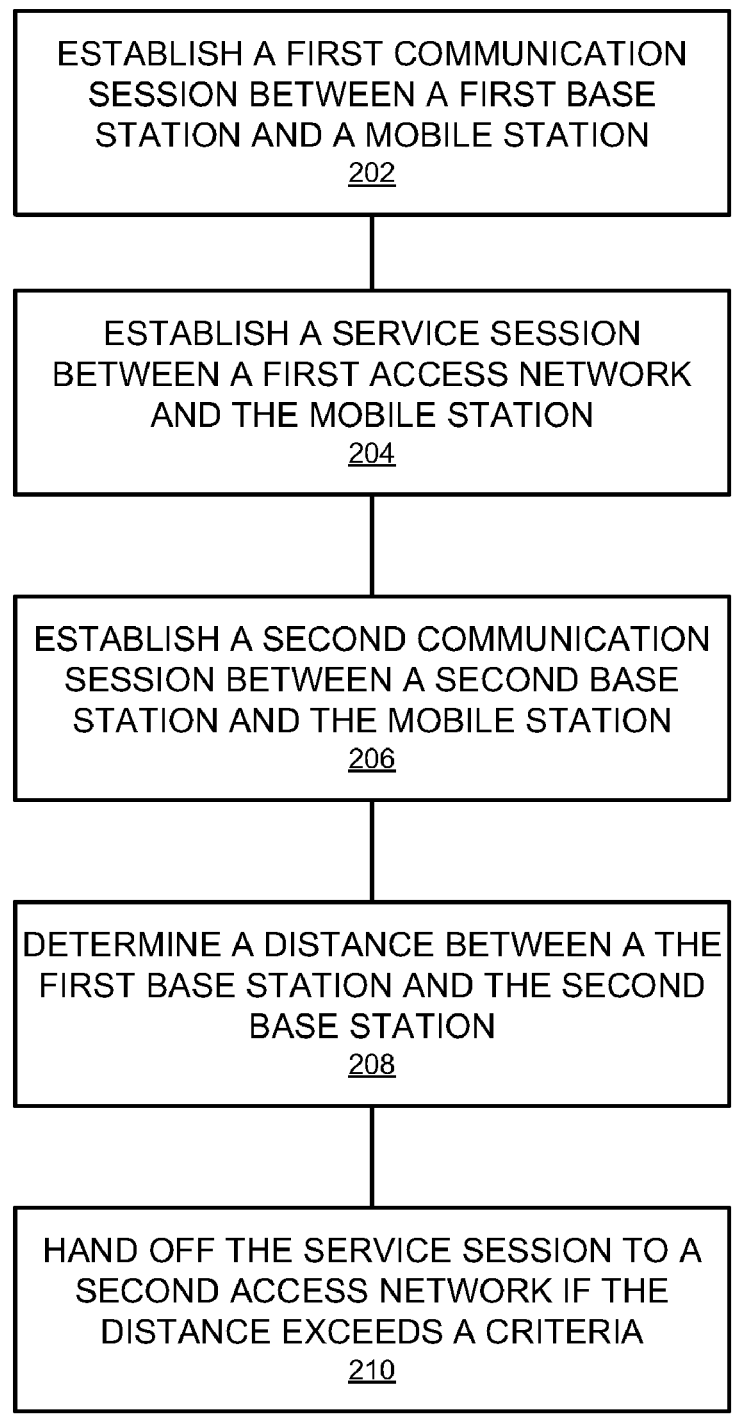
FIG. 2 is a flowchart illustrating a method of handing off a mobile station between ASNs.

FIG. 2 is a flowchart illustrating a method of handing off a mobile station between ASNs. The method of FIG. 2 may be performed by communication system 100. A first communication session is established between a first base station and a mobile station (202). For example, a communication session may be established between base station 130 and mobile station 150 when mobile station 150 enters communication network 100. In another example, a communication session may be established between base station 130 and mobile station 150 when mobile station 150 enters base station service area 140.

A service session is established between a first access network and the mobile station (204). For example, communication network 100 may establish a service session between ASN-GW-A 110 and mobile station 150.

A second communication session is established between a second base station and the mobile station (206). For example, a communication session may be established between base station 133 and mobile station 150 when mobile station 150 enters base station service area 143.

A distance between the first base station and the second base station is determined (208). For example, communication network 100 may determine the number of base station service areas crossed by a line between base station 130 and base station 133. In another example, communication network 100 may determine the minimum number of base station service areas between base station 130 and base station 133. Using FIG. 1 as an illustration, this number may be two corresponding to the service areas for base stations 131 and 132. In another example, communication network 100 may determine the minimum number of base station service areas that must be crossed along a path from base station 130 to base station 133. In another example, communication network 100 may determine the number of unique base station service areas traversed by mobile station 150 as mobile station traveled from base station service area 140 to base station service area 143.

If the distance determined in step 208 exceeds a criteria, the service session is handed off to a second access network (210). For example, if communication network 100 determines that there are at least N (where N is an arbitrary number greater than zero) base station service areas separating base station 130 and base station 133, communication network 100 may handoff service session for mobile device 150 from ASN-GW-A 110 to ASN-GW-B 111. ASN-GW-A 110 and ASN-GW-B 111 may exchange communication via R4 protocol to accomplish the handoff.

Figure 3:
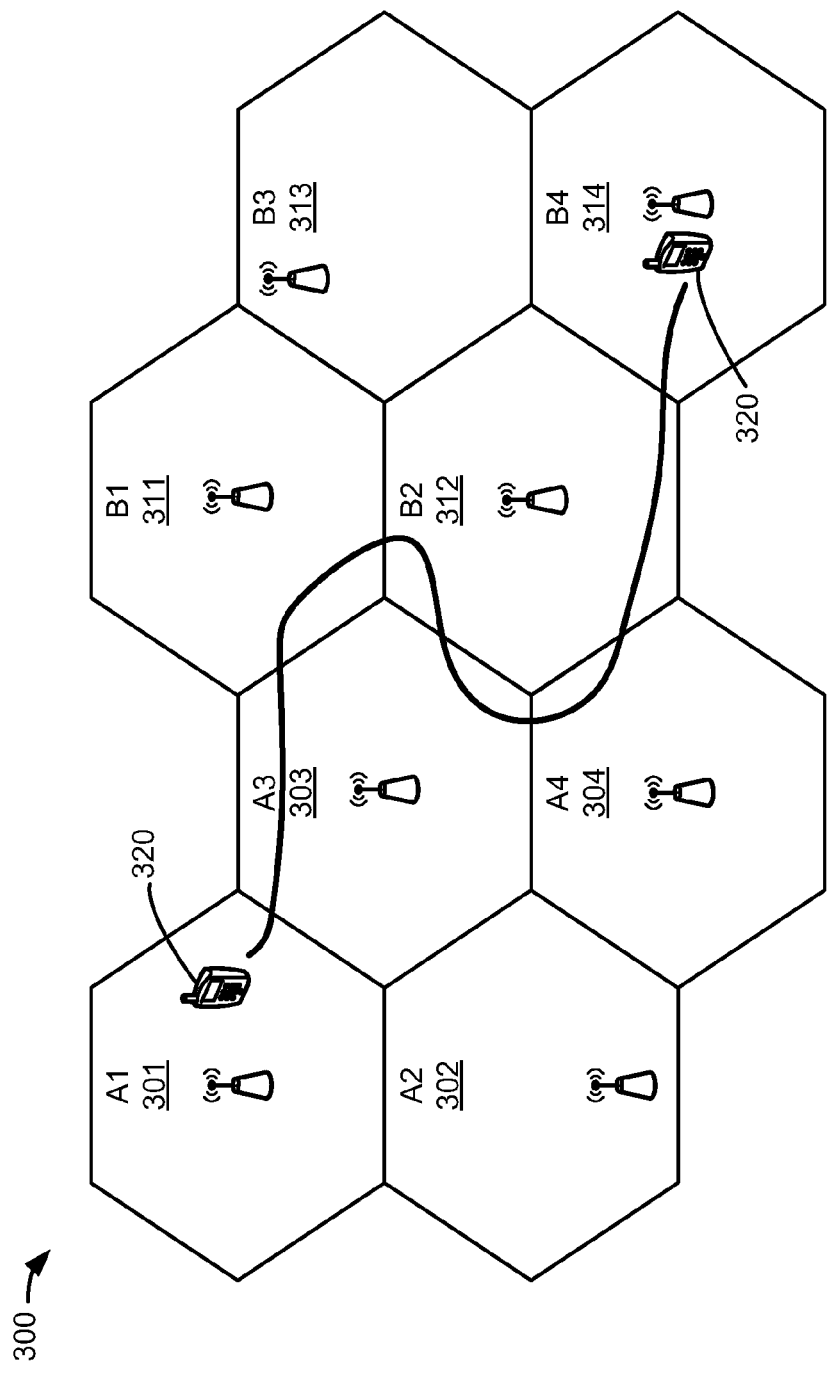
FIG. 3 is an illustration of a mobile station moving across base station service areas.
Figure 4:
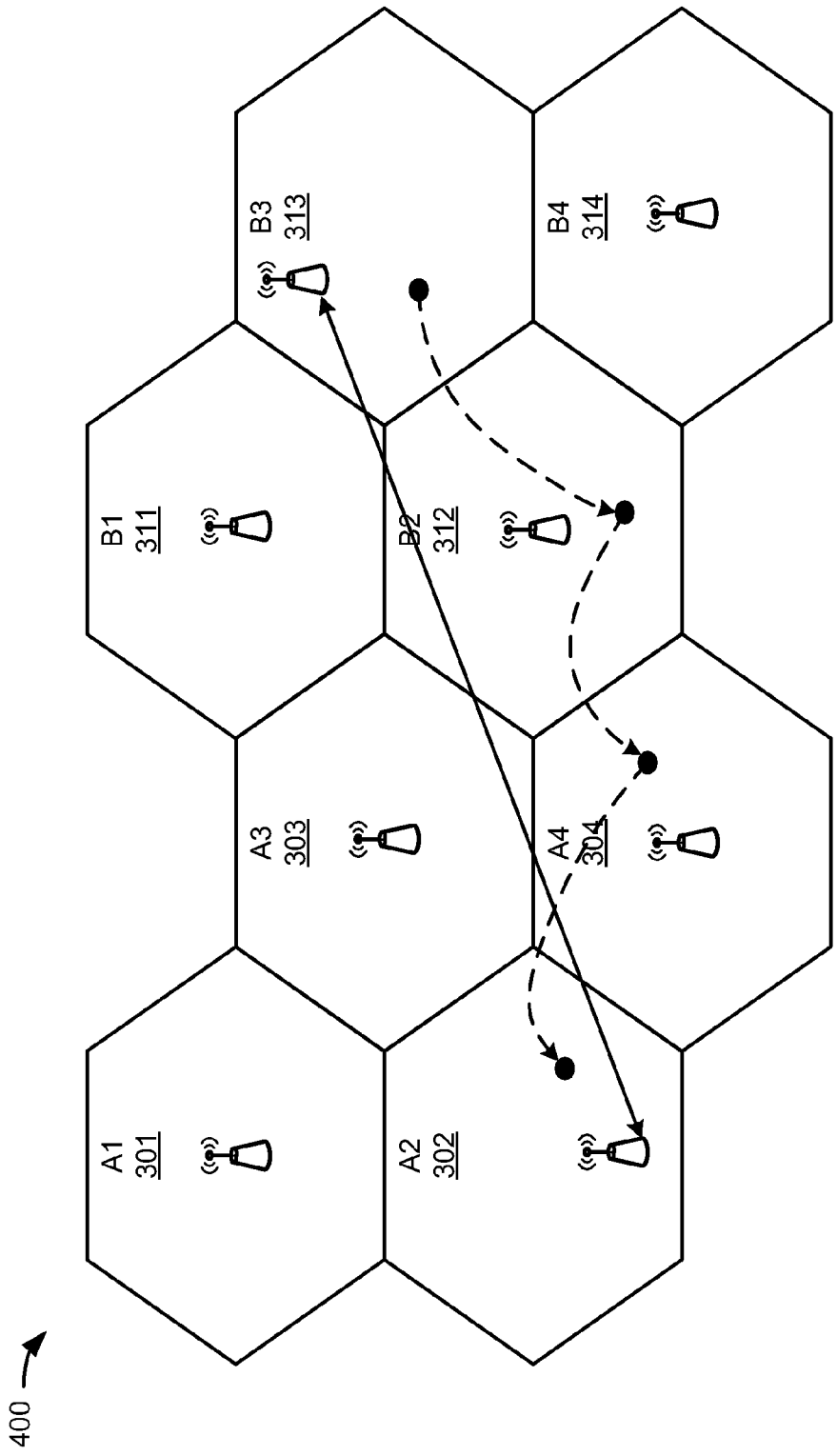
FIG. 4 is an illustration of distances between base station service areas.

FIG. 3 is an illustration of a mobile station moving across base station service areas. FIG. 4 is an illustration of distances between base station service areas. FIGS. 3 and 4 show a plurality of base station service areas 300. FIG. 3 and FIG. 4 illustrate four base station service areas 301-304 primarily serviced by a first ASN-GW. For example, when mobile station 320 is first powered in any one of base station service areas 301-304, the first ASN-GW (e.g., ASN-GW-A 110) would provide the service session for mobile station 320. FIG. 3 and FIG. 4 also illustrate four base station service areas primarily serviced by a second ASN-GW. For example, if mobile station 320 was first powered in any one of base station service areas 311-314, the second ASN-GW (e.g., ASN-GW-B 111) would provide the service session for mobile station 320.

In FIG. 3 and FIG. 4, base station service areas 301-304 and 311-314 are shown as hexagons that share a side with one or more other base station service areas 301-304 and 311-314. Base station service area A1 301 is adjacent to base station service areas A2 302 and A3 303. Base station service area A2 is adjacent to base station service areas A1 301, A3 303, and A4 304. Base stations service area A3 is adjacent to base station service areas A1 301, A2 302, A4 304, B1 311, and B2 312. Base station service area A4 is adjacent to base station service areas A2 302, A3 303, and B2 312. Base station service area B1 is adjacent to base station service areas A3 303, B2 312, and B3 313. Base station service area B2 312 is adjacent to base station service areas A4 304, A3 303, B1 311, B3 313, and B4 314. Base station service area B3 313 is adjacent to base station service areas B1 311, B2 312, and B4 314. Base station service area B4 314 is adjacent to base station service areas B2 312 and B3 313.

FIG. 3 includes an example path traversed by a mobile station 320. This path originates in base station service area A1 301 and then sequentially enters the following base station service areas in the following order: A3 303; B1 311; B2 312; A3 303; A4 304; B2 312; and finally B4 314. If a mobile station 320 was only serviced by a first ASN-GW while in the "A" base station service areas 301-304, and only by a second ASN-GW while in the "B" base station service areas 311-314, then each time mobile station 320 crossed from an "A" base station service area 301-304 into a "B" base station service area a handoff between the first and second ASN-GW would take place.

To illustrate, consider the path traversed by a mobile station 320 shown in FIG. 3. While traveling this path, mobile station 320 would be handed off between the first and second ASN-GW three times. Once each for: (1) when mobile station 320 crossed from base station service area A3 303 to B1 311; (2) when mobile station 320 crossed from base station service area B2 312 to A3 303; and, (3) when mobile station 320 crossed from base station service area A4 304 to B2 312.

In an embodiment, mobile station 320 is not handed off between ASN-GWs until a distance criteria is met. A distance is determined from a location indicative of mobile station 320's present location and either: (a) a location indicative of where the mobile station 320 entered the network or was powered on; or, (b) a location indicative of where the mobile station 320 was last handed off between ASN-GWs. If that distance meets a distance criteria, then mobile station 320 will be handed off to a new ASN-GW. Otherwise, mobile station 320 will continue to be serviced by the current ASN-GW.

In an embodiment, the distance may determined by counting the number of base station service areas crossed by a line between two base stations. For example, the first base station may be the base station where the mobile station 320 first entered the network or was last handed off. The second base station may be the base station currently servicing mobile station 320. The distance determined may be the number of intervening base station service areas along a straight line between the first and second base stations.

To illustrate, consider FIG. 3 taking the first base station to be the base station for base station service area A1 301. Take the second base station to be the base station for base station service area B4 314. In this example, the number of intervening base station service areas along a straight line between base station A1 301 and B4 314 is two (e.g., A3 303 and B2 312). In another example, the base station service areas for the first and/or second base stations may be counted. In that case, the number of intervening base station service areas along a straight line between base station A1 301 and B4 314 is four (e.g., A1 301, A3 303, B2 312, and B4 314).

Consider a case where the distance criteria is two intervening base station service areas. Also, in this case, the distance is determined by counting the number of base station service areas crossed by a line between the base station where the mobile station 320 first entered the network or was last handed off, and the base station currently servicing mobile station 320. Now consider the path traversed by a mobile station 320 shown in FIG. 3. In this example, mobile station 320 would only be handed off once—when it moved into base station service area B4 314 from base station service area B2 312. At all other times, the distance criteria would not be met or exceeded. (E.g. when mobile station 320 is in the other base station service areas along the path shown in FIG. 3, there are less than two intervening base station service areas.) In general, to reduce the "ping-pong" effect, the distance criteria should be chosen so that the number of intervening base station service areas is greater than zero.

Other ways to determine a distance and whether it meets a criteria are also possible. For example, an absolute distance between the first and second base station may be used. Then, a certain threshold distance that is indicative of there being a certain number of intervening base stations may be used as the distance criteria. For example, if the average diameter of a base station service area is 2 km, then a distance of 4 km or greater may be used as a distance criteria that is indicative of there being at least one intervening base station service area. In another example, the distance between the position of mobile station 320 when it entered the network or was last handed off and its present position may be used and a similar distance criteria applied.

In another example, the distance determined may correspond to the minimum number of base station service areas between a service area for the first base station and a service area for the second base station. Given that base station service areas may be asymmetrical around the base station, or may be irregularly shaped, a straight line between base stations may cross more base station service areas than the minimum number of base station service areas that must be crossed. This possibility is illustrated in FIG. 4.

In FIG. 4, a straight line is shown between the base stations for base station service areas A2 302 and B3 313. The base station for base station service area A2 302 lies in the lower portion of the hexagon. The base station for base station service area B3 lies in the upper portion of the hexagon. As can be seen in FIG. 4, the straight line between these base stations crosses base station service areas B1 311, B2 312, A3 303, and A4 304. However, the minimum number of service areas between base station service area B3 313 and A2 302 is two (B2 312 and A4 304). This is shown by the dots at the end of the dashed arrows in B2 312 and A4 304 in FIG. 4.

It should be understood that another way to count a minimum number of base station service areas between two base station service areas is to count "hops." For the above example, this would be three "hops." This is illustrated by the dashed arrows in FIG. 4 that go from: (1) B3 313 to B2 312; (2) B2 312 to A4 304; and, (3) A4 304 to A2 302. In addition, rather than counting service areas between service areas, the count may be the minimum number of base station service areas between base stations.

In another embodiment, the distance determined corresponds to the number of unique base station service areas traversed by the mobile station between establishing the first communication session and the second communication session. Using the path of FIG. 3 as an example, the number of unique base stations traversed by mobile station 320 on its path from base station service area A1 301 to B4 314 is four (e.g., A3 303, B1 311, B2 312, and A4 304). In another example, the number of unique base stations traversed by mobile station 320 on its path from base station service area A1 301 to B4 314 may be counted as six if the first (A1 301) and current (B4 314) base station service areas are counted.

The methods, systems, networks, gateways, mobile stations and base stations described above may be implemented with, contain, or be executed by one or more computer systems. The methods described above may also be stored on a computer readable medium. Many of the elements of communication network 100 may be, comprise, or include computers systems. This includes, but is not limited to: communication systems 100; ASN-GW-A 110; ASN-GW-B 111; R4 protocol link 120; base stations 130-133; and mobile stations 150 and 320.

Figure 5:
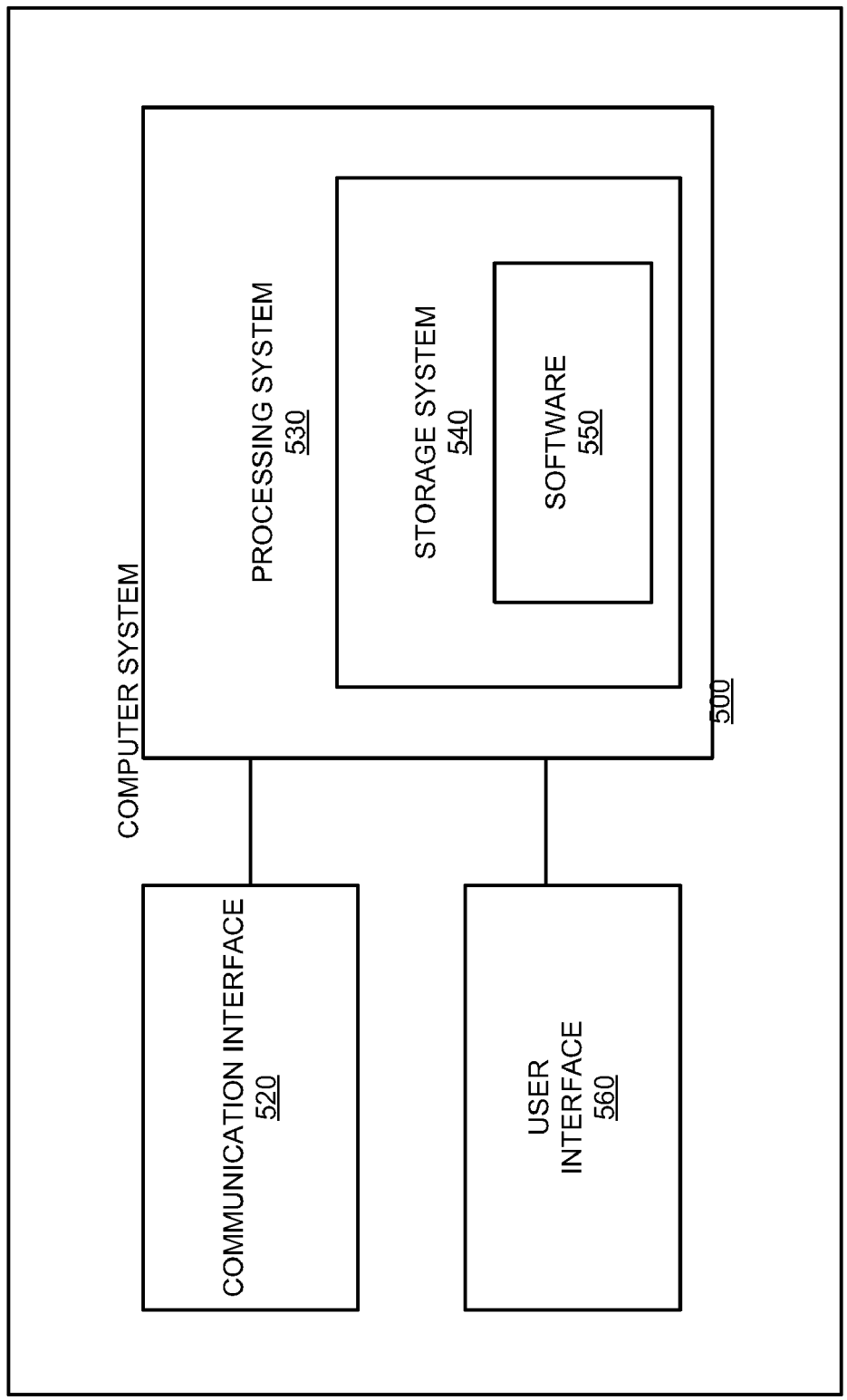
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    establishing a first communication session between a first base station and a mobile station;
    establishing a service session between a first access network and the mobile station;
    establishing a second communication session between a second base station and the mobile station;
    determining a distance between the first base station and the second base station; and
    if the distance exceeds a criteria, handing off the service session to a second access network;
    wherein the criteria corresponds to a number of base station service areas separating a service area for the first base station and a service area for the second base station; and
    wherein the criteria corresponds to the number of base station service areas separating the service area for the first base station and the service area for the second base station being at least greater than zero.

2. The method of claim 1, wherein the distance corresponds to a number of base station service areas crossed by a line between the first base station and the second base station.

3. The method of claim 1, wherein the distance corresponds to a minimum number of base station service areas between a service area for the first base station and a service area for the second base station.

4. The method of claim 1, wherein the distance corresponds to a minimum number of base station service areas that must be crossed along a path from the first base station to the second base station.

5. The method of claim 1, wherein the distance corresponds to a number of unique base station service areas traversed by the mobile station between establishing the first communication session and the second communication session.

6. The method of claim 1, wherein the service session is handed off using an R4 protocol exchange between the second access network from the first access network.

7. The method of claim 6, further comprising:
    ending the first communication session.

8. A communication system, comprising:
    a first access network coupled to a first base station and a second base station, the first base station and the second base station having a number of base station service areas separating the first base station and the second base station;
    a second access network coupled to the first base station and the second base station;
    wherein the first base station establishes a communication session with a mobile station, and the first base station establishes a service session between the mobile station and the first access network;
    and wherein the second base station establishes a service session between the mobile station and the second access network when the second base station and the mobile station establish a second communication session if a distance between the first base station and the second base station satisfies a distance criteria;
    and wherein the distance criteria is based on the number of base station service areas separating a service area for the first base station and a service area for the second base station; and
    wherein the distance criteria corresponds to the number of base station service areas separating the service area for the first base station and the service area for the second base station being greater than at least zero.

9. The communication system of claim 8, wherein the distance criteria corresponds to a minimum number of service areas crossed by a line between the first base station and the second base station.

10. The communication system of claim 8, wherein the distance criteria corresponds to a minimum number of base station service areas between the service area for the first base station and the service area for the second base station.

11. The communication system of claim 8, wherein the distance criteria corresponds to a minimum number of base station service areas that must be crossed along a path from the first base station to the second base station.

12. The communication system of claim 8, wherein the distance criteria corresponds to a number of unique base station service areas traversed by the mobile station between establishing the first communication session and the second communication session.

13. The communication system of claim 8, wherein the second service session is a result of a handing off the mobile station to the second access network from the first access network.

14. A method of operating a WiMAX communication system, comprising:
    establishing a first communication session between a first base station and a mobile station;
    establishing a service session between a first Access Service Network Gateway (ASN-GW) and the mobile station;
    establishing a second communication session between a second base station and the mobile station;
    determining a distance between the first base station and the second base station; and
    if the distance exceeds a criteria, handing off the service session from the first ASN-GW to a second ASN-GW;
    wherein the criteria corresponds to a number of base station service areas separating a service area for the first base station and a service area for the second base station; and
    wherein the criteria corresponds to the number of base station service areas separating the service area for the first base station and the service area for the second base station being at least greater than zero.

15. The method of claim 14, wherein the distance corresponds to a number of base station service areas crossed by a line between the first base station and the second base station.

16. The method of claim 14, wherein the distance corresponds to a minimum number of base station service areas between a service area for the first base station and a service area for the second base station.

17. The method of claim 14, wherein the distance corresponds to a minimum number of base station service areas that must be crossed along a path from the first base station to the second base station.

18. The method of claim 14, wherein the distance corresponds to a number of unique base station service areas traversed by the mobile station between establishing the first communication session and the second communication session.

19. The method of claim 14, wherein the first base station has a direct link to the first ASN-GW and the second ASN-GW.

20. The method of claim 19, wherein the second base station has a direct link to the first ASN-GW and the second ASN-GW.

* * * * *